United States Patent [19]
Yip

[11] Patent Number: 5,598,765
[45] Date of Patent: Feb. 4, 1997

[54] TOASTER

[75] Inventor: Kit C. Yip, Kowloon, Hong Kong

[73] Assignee: G.E.W. Corporation Limited, Kowloon, Hong Kong

[21] Appl. No.: 516,619

[22] Filed: Aug. 18, 1995

[30] Foreign Application Priority Data

Aug. 18, 1994 [GB] United Kingdom .............. 9416777

[51] Int. Cl.$^6$ .................................................. A47J 37/08
[52] U.S. Cl. ................. 99/327; 99/329 P; 99/329 RT; 99/389; 99/391
[58] Field of Search ................... 99/325–333, 342, 99/389–402; 219/521, 492, 494, 497, 501, 518, 519, 413

[56] References Cited

U.S. PATENT DOCUMENTS

| | | | |
|---|---|---|---|
| 2,553,593 | 5/1951 | Lermont | 99/327 |
| 3,140,650 | 7/1964 | Woron | 99/327 |
| 3,636,858 | 1/1972 | Paaskesen | 99/329 RT |
| 4,188,865 | 2/1980 | Bjarsch | 99/329 R |
| 4,345,513 | 8/1982 | Holt | 99/391 |
| 4,345,515 | 8/1982 | Holt | 99/393 |
| 4,402,258 | 9/1983 | Guarnerio | 99/393 |
| 4,976,195 | 12/1990 | Cavazos | 99/390 |
| 4,986,173 | 1/1991 | Hahnewald et al. | 99/400 |

FOREIGN PATENT DOCUMENTS

| | | |
|---|---|---|
| 810944 | 3/1959 | United Kingdom . |
| 1049375 | 11/1966 | United Kingdom . |
| 1176213 | 1/1970 | United Kingdom . |
| 1400429 | 7/1975 | United Kingdom . |
| 8906927 | 8/1989 | WIPO . |

*Primary Examiner*—Timothy F. Simone
*Attorney, Agent, or Firm*—Birch, Stewart, Kolasch & Birch, LLP.

[57] ABSTRACT

A toaster has a casing, a carrier for supporting a slice of bread, the carrier being movable between an upper position to expose the slice of bread outside the casing and a lower position to render the slice of bread inside the casing, a heating element provided inside the casing for heating the slice of bread when the carrier is in the lower position, an internal operating mechanism for moving the carrier, the operating mechanism including a spring assembly for resiliently biasing the carrier upwards and holding means including a stationary solenoid for holding the carrier in the lower position, and a time for controlling the time period during which the slice of bread is to be heated by the heating element wherein the holding means is releasable by a user at point other than the solenoid or with a force relatively smaller than the holding force of the solenoid in order to release the carrier from the lower position at any time during the time period.

16 Claims, 5 Drawing Sheets

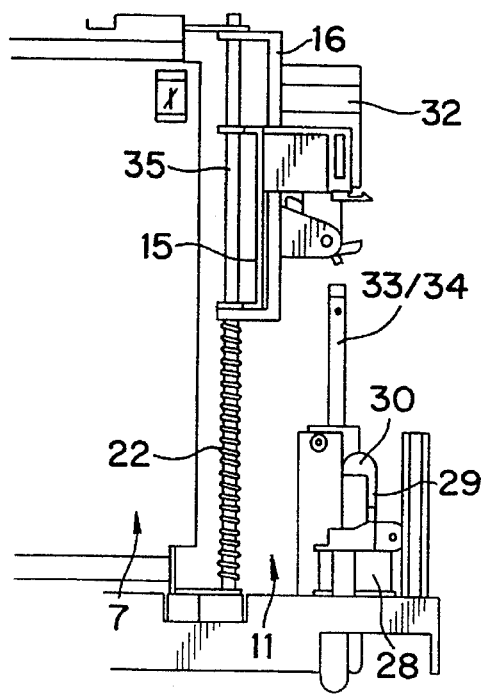
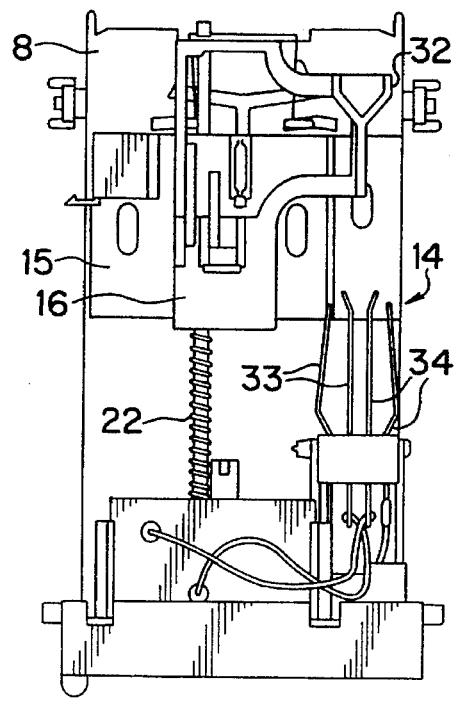
FIG. 3A    FIG. 3B
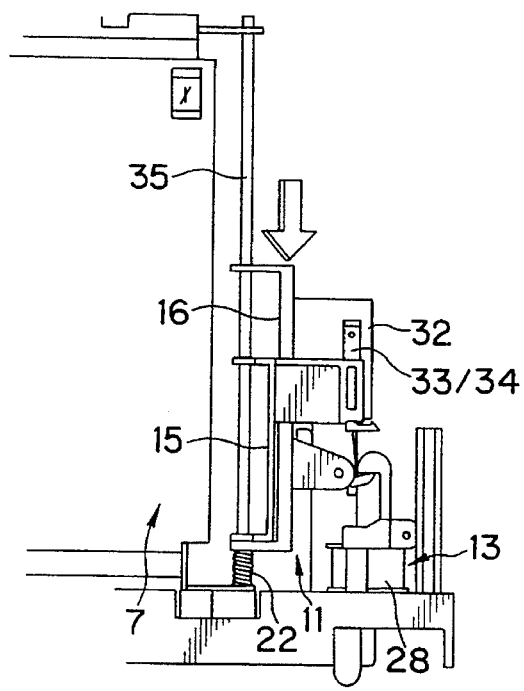
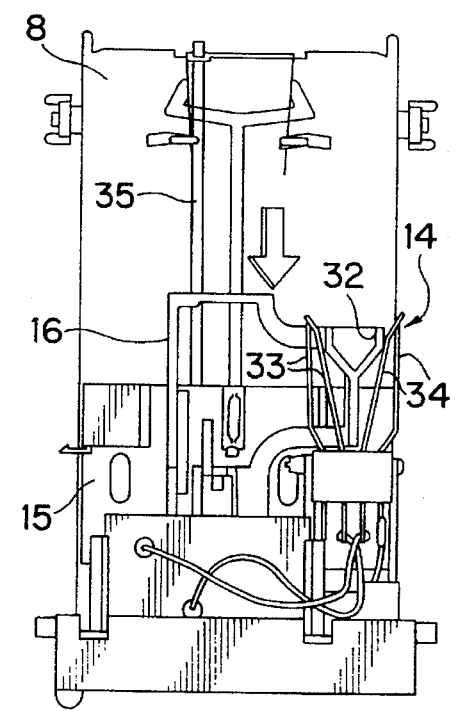
FIG. 4A    FIG. 4B

TOASTER

SUMMARY OF THE INVENTION

The present invention relates to a toaster.

In a first aspect, the invention provides a toaster which comprises a casing, a carrier for supporting a slice of bread, the carrier being movable between an upper position to expose the slice of bread outside the casing and a lower position to render the slice of bread inside the casing, a heating element provided inside the casing for heating the slice of bread when the carrier is in the lower position, an internal operating mechanism for moving the carrier, the operating mechanism comprising spring means for resiliently biassing the carrier upwards and holding means comprising a stationary solenoid for holding the carrier in the lower position, and a timer for controlling the time period during which the slice of bread is to be heated by the heating element, characterised in that the holding means is releasable by a user at point other than the solenoid in order to release the carrier from the lower position at any time during the time period.

In a second aspect, the invention provides a toaster which comprises a casing, a carrier for supporting a slice of bread, the carrier being movable between an upper position to expose the slice of bread outside the casing and a lower position to render the slice of bread inside the casing, a heating element provided inside the casing for heating the slice of bread when the carrier is in the lower position, an internal operating mechanism for moving the carrier, the operating mechanism comprising spring means for resiliently biassing the carrier upwards and holding means comprising a stationary solenoid for holding the carrier in the lower position, and a timer for controlling the time period during which the slice of bread is to be heated by the heating element, characterised in that the holding means is releasable by a user with a force relatively smaller than the holding force of the solenoid in order to release the carrier from the lower position at any time during the said time period.

Preferably, the holding means further includes two interengageable latching parts associated with the carrier and the solenoid, respectively, one of the latching parts being releasable by a user at any time during the time period in order to release the carrier from the lower position.

More preferably, the one latching part is associated with the carrier.

It is preferred that the operating mechanism further includes a first movable part connected with the carrier, to which movable part the one latching part is hinged.

More preferably, the operating mechanism further includes a second movable part which is movable relative to the first movable part in one direction to engage with and thus to maintain the one latching part in engagement with the other latching part position and in the opposite direction to disengage from and thus to allow the one latching part to disengage from the other latching part.

It is preferred that the second movable part is movable in the first direction under the action of gravity.

Preferably, the other latching part is hinged and is arranged to be maintained in engagement with the one latching part by the solenoid.

In a preferred embodiment, the operating mechanism further includes a handle associated with the carrier and adapted to be moved by a user downwards in order to move the carrier to the lower position and upwards in order to release the carrier from the lower position at any time during the said time period.

In a third aspect, the invention provides a toaster which comprises a casing, a carrier for supporting a slice of bread, the carrier being movable between an upper position to expose the slice of bread outside the casing and a lower position to render the slice of bread inside the casing, a heating element provided inside the casing for heating the slice of bread when the carrier is in the lower position, an internal operating mechanism for moving the carrier, the operating mechanism comprising spring means for resiliently biassing the carrier upwards and holding means comprising a stationary solenoid for holding the carrier in the lower position, and a timer for controlling the time period during which the slice of bread is to be heated by the heating element, characterised in that the operating mechanism further includes a handle associated with the carrier and adapted to be moved by a user downwards in order to move the carrier to the lower position and upwards in order to release the carrier from the lower position at any time during the said time period, the downward movement of the handle requiring a force which is relatively smaller than the holding force of the solenoid.

BRIEF DESCRIPTION OF THE DRAWINGS

The invention will now be more particular described, by way of example only, with reference to the accompanying drawings, in which:

FIGS. 3A and 3B are corresponding side and end views of the operating mechanism of FIGS. 1A to 1C, in a rest operating condition;

FIGS. 4A and 4B are corresponding side and end views of the operating mechanism of FIGS. 1A to 1C, in a working operating condition;

DETAILED DESCRIPTION OF THE INVENTION

Figure 1A:
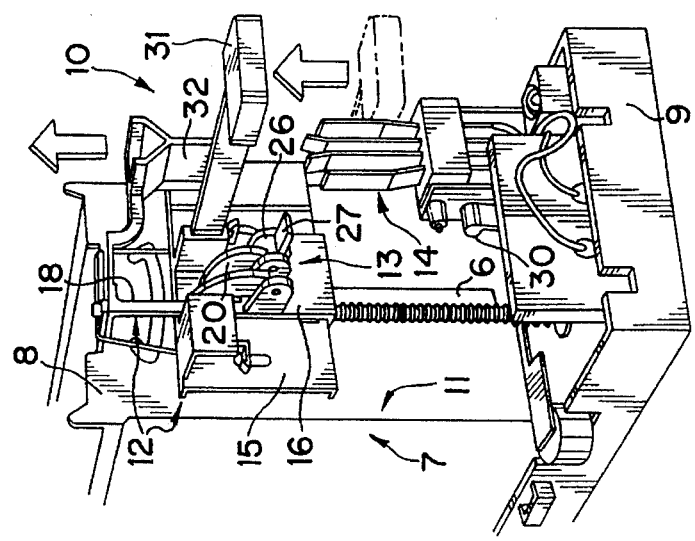
FIGS. 1A to 1C are perspective views of an internal operating mechanism of an embodiment of a toaster in accordance with the invention, in different operating conditions.
Figure 1B:
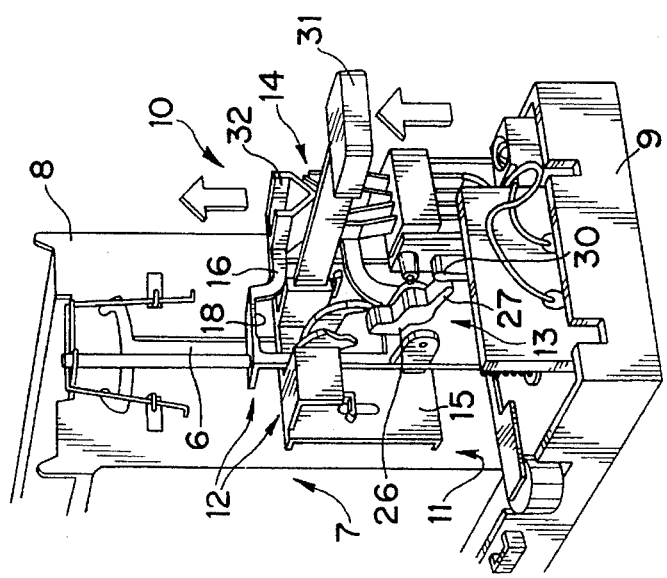
Figure 1C:
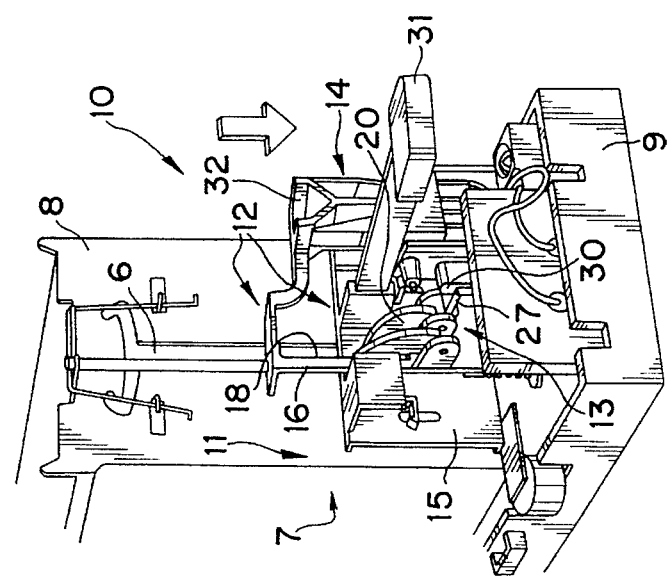

Referring to the drawings, there is shown an internal operating mechanism 10 of a toaster embodying the invention, which operating mechanism 10 is installed inside one end of the toaster. As partially shown, the toaster has a tray-like base 9 and a fixed transversely-extending vertical partition 8 standing on the base 9. The toaster further includes a rectangular cuboidal casing, as in conventional toasters, in which (as shown) the partition 8 defines on its rear side a toasting compartment 7 and on its front side a comparatively much thinner end compartment 11 for accommodating the operating mechanism 10.

Although this is not shown in the drawings, the toasting compartment 7 houses a vertically slidable carriage for supporting two slices of bread to be toasted and heating elements located on opposite sides of the slices of bread so supported for heating the bread. The top wall of the casing has a longitudinally-extending slot through which the slices of bread can be inserted into or removed from the toaster.

The operating mechanism 10 has four principal parts, namely a carriage-moving unit 12 for moving the bread carriage, a holding unit 13 for holding the carriage-moving unit 12 and hence the bread carriage in a lowermost position for bread toasting, a switching unit 14 for controlling the operation of the bread heating elements (and an electro-magnetic solenoid 28 to be introduced later), and a timer (not shown).

Figure 2:
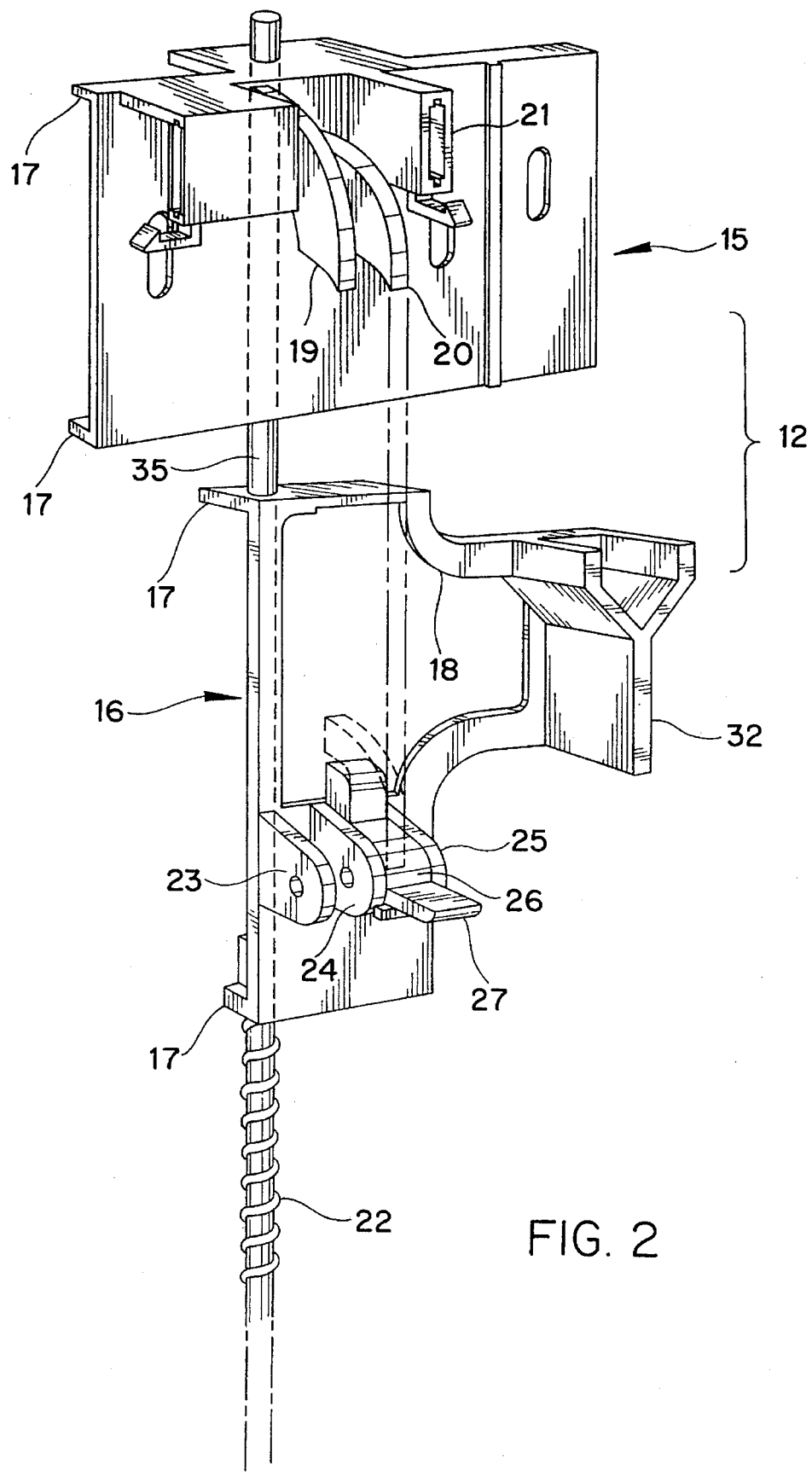
FIG. 2 is an enlarged perspective view of two sliders on a pole of the operating mechanism of FIGS. 1A to 1C.
Figure 4C:
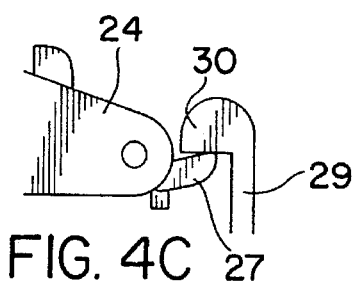
FIG. 4C shows in detail from FIG. 4A an engagement between the co-operating hooking portions 27 and 30.
Figure 5A:
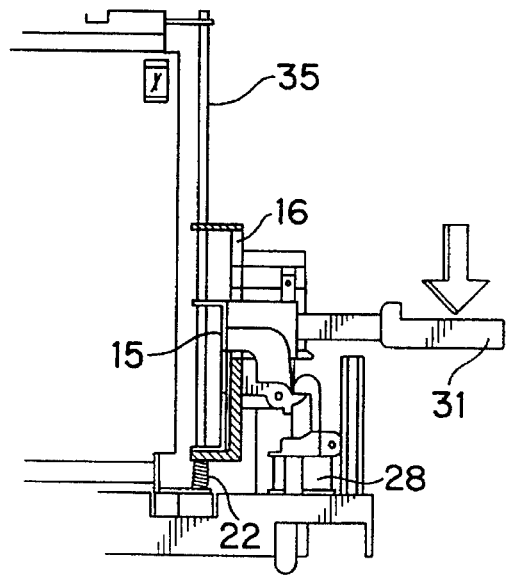
FIGS. 5A to 5C are three sides views of the operating mechanism of FIGS. 1A to 1C, in different operating conditions corresponding to those as illustrated in FIGS. 1A to 1C.
Figure 5B:
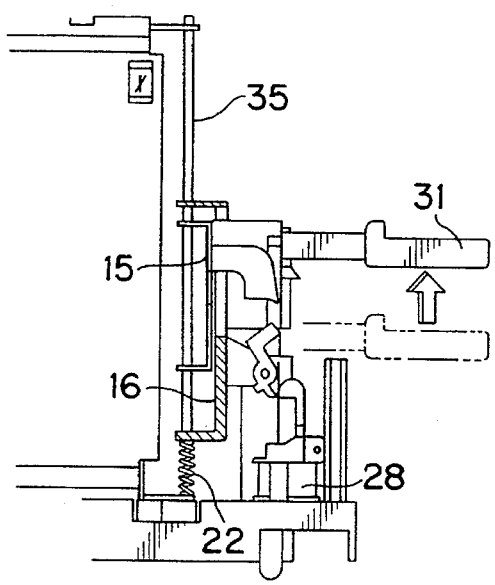
Figure 5C:
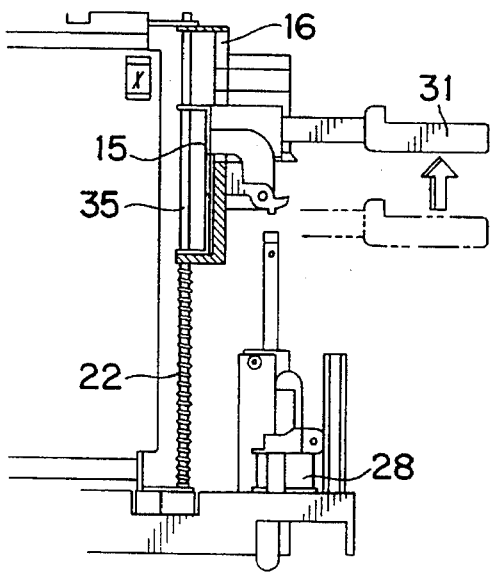
Figure 6A:
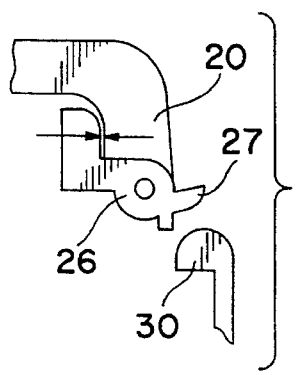
FIGS. 6A–6I are a series of enlarged sequential side views, taken out from FIG. 5A, illustrating a engaging-and-disengaging operation of co-operable parts of the sliders of FIG. 2 in action with a solenoid-operated hook.
Figure 6B:
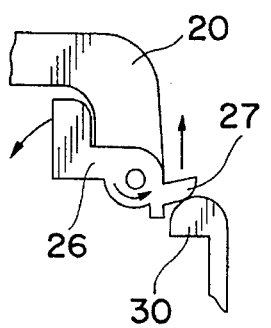
Figure 6C:
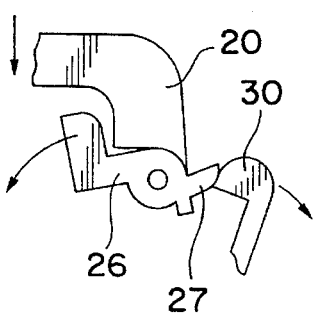
Figure 6D:
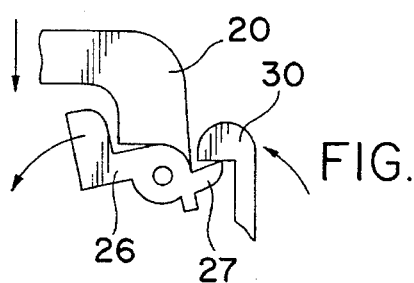
Figure 6E:
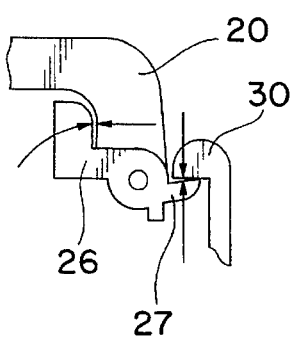
Figure 6F:
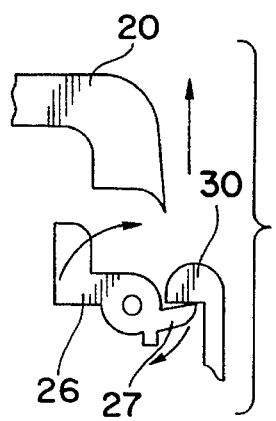
Figure 6G:
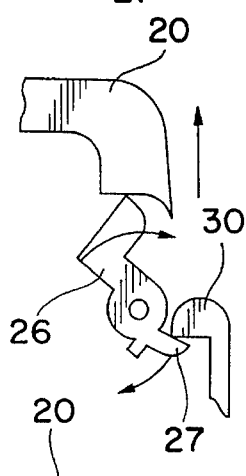
Figure 6H:
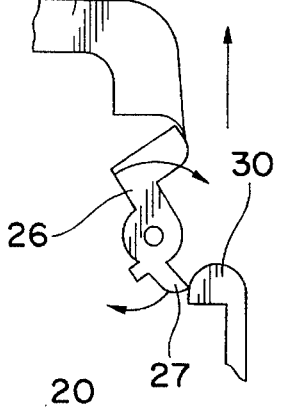
Figure 6I:
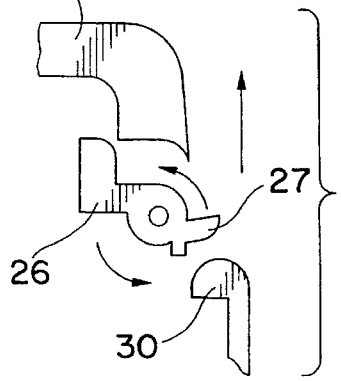

Referring firstly to the carriage-moving unit 12 (best shown in FIG. 2), it is formed by a fixed vertical pole 35 extending from top to bottom of the toaster casing, and inner and outer sliders 15 and 16 mounted on the pole 35 for vertical movement therealong. Each of the sliders 15 and 16 has top and bottom backward flanges through which the pole 35 extends. The outer slider 16 is relatively longer than the inner slider 15 and is arranged to embrace the inner slider 15 between its top and bottom flanges 17, lying close thereto.

The partition 8 has a central vertical slot 6, from which the pole 35 is laterally off-set. The bread carriage has a part passing through the slot 6 from behind and secured to the inner slider 15, and is thus movable by and at the same time with the inner slider 15. The inner slider 15 is vertically and freely slidable between the top and bottom flanges 17 of the outer slider 16, and has a normal rest position sitting internally on the outer slider's bottom flange 17 under the action of its own weight and the weight of the bread carriage (and the weight of a handle bar 31 to be introduced later) A compression spring 22 is disposed on the bottom half of the pole 35, acting resiliently to urge the outer slider 16 and hence the inner slider 15 and the bread carriage upwards into a normal top position, as shown in FIGS. 1C, 3A, 3B and 5C.

The outer slider 16 has a large aperture 18 through which three integral arms 19 to 21 of the inner slider 15 extend forward. Immediately under the aperture 18, the outer slider 16 has three integral arms 23 to 25 extending forward. The inner slider's middle arm 20 is aligned with the gap formed between the middle and the right-side arms 24 and 25 of the outer slider 16. A hook member 26 is located in the gap between the arms 24 and 25, freely hinged about a horizontal axis. The hook member 26 has an integral hooking portion 27, and assumes a normal rest angular position in which its hooking portion 27 points horizontally forward.

The arm 20 of the inner slider 15 has a bottom profile matching with the top profile of the hook member 26 directly below. In the rest position of the inner slider 15 relative to the outer slider 16, the arm 20 engages from above with the hook member 26, thereby holding the hook member 26 firmly in its rest angular position against pivoting downwards, with their matching profiles being in a fit inter-engagement behind the hinging axis of the hook member 26.

A handle bar 31 is secured to the right-side arm 21 of the inner slider 15, extending horizontally forward.

The holding unit 13 is now specifically referred to, which is formed in part by the middle arm 20 of the inner slider 15 and the hook member 26 on the outer slider 16. The holding unit 13 further includes an electro-magnetic solenoid 28 and a hook 29 which is hinged on the solenoid 28 about a horizontal axis to pivot freely within a limited extent. The hook 29 normally points vertically upwards under its own weight, and has a hooking portion 30 which extends in a horizontal direction when the hook 29 is in the normal vertical position. A soft-iron plate (not shown) is fixed on the bottom of the hook 29, which is arranged to be magnetically attracted by the solenoid 28, and thus bearing against it, when the solenoid 28 is energized in order to maintain by force the hook 29 in its normal vertical position.

The hooking portion 27 of the hook member 26 above and the hooking portion 30 of the hook 29 below are aligned with each other such that when the upper hooking portion 27 is moved downward with the outer slider 16 against the action of the spring 22 (as described below) to and against the lower hooking portion 30, the hook 29 will give way by pivoting backwards against the magnetic attraction force of the solenoid 28, as illustrated in FIG. 6—the hooking portions 27 and 30 have rounded inter-engaging profiles to facilitate this action. When this happens, the hooking portion 30 will ride round the forthcoming hooking portion 27 and subsequently engage rigidly therewith when the hook 29 has eventually returned to its normal vertical position under the persistent magnetic attraction of the solenoid 28. The solenoid attraction is sufficiently strong to hold the hook 29 in such a returned normal vertical position, against the action of the spring 22 acting indirectly upon the hook member 26.

Throughout this engagement action, the inner slider 15 remains resting on the bottom flange 17 of the outer slider 16. As a result, the hook member 26 on the outer slider 16 is at all time being held firmly in its rest angular position by the arm 20 of the inner slider 15, as described above, and will therefore not disengage from the hook 29.

In the resulting condition, the outer slider 16 is held against the action of the spring 22 into a bottom position, as shown in FIGS. 1A, 4A, 4B and 5A, through interengagement between the co-operating hooking portions 27 and 30.

The switching unit 14 is now referred to, which is arranged to control the supply of electrical power to the solenoid 28 as well as the heating elements. An integral Y-shaped member 32 formed on the right side of the outer slider 16 provides one of the two parts of the switching unit 14. The outer part is provided by a series of four upwardly-pointing and spaced-apart switch contacts, forming two adjacent pairs 33 and 34. The series of switch contacts 33 and 34 is symmetrically aligned with the Y-shaped member 32 above. When the Y-shaped member 32 is moved downwards with the outer slider 16, it will enter into the gap between the two inner switch contacts 33 and 34 and then urge them further apart and eventually against the corresponding two outer switch contacts 33 and 34, thereby closing the two pairs of switch contacts 33 and 34 at the same time. This results in simultaneous switching-on of the heating elements and the solenoid 28.

Referring finally to the timer, which is triggered to start running upon switching-on of the heating elements and the solenoid 28. The timer then counts a pre-determined or selected period of time, and at the end of the counted time period operates automatically to cut off the power supply to the solenoid 28 by means of an electrical switch or switching arrangement (not shown). The timer can be either a mechanical wind-up spring timer or an electronic digital timer or the like, as in conventional toasters or other electrical appliances. As the core of the present invention does not reside in the construction and/or configuration of the timer, it will not be described in further detail here.

In operation, a user is to move the bread carriage, supporting thereon one or two slices of bread, downwards by pressing on the handle bar 31. As the handle bar 31 is secured to the inner slider 15 and the inner slider 15 is resting internally on the outer slider 16, the outer slider 16 is moved downwards with the inner slider 15 remaining and being maintained in its rest position relative to the outer slider 16. Immediately before the outer slider 16 reaches its bottom position, the Y-shaped member 32 comes into action and closes both switch contact pairs 33 and 34, thereby switching on the heating elements and the solenoid 28. When the outer slider 16 finally reaches its bottom position, the hook member 26 and the hook 29 then come into inter-engagement in order to hold the outer slider 16 in the bottom position and hence the bread carriage and in turn the bread slices wholly inside the toaster for treatment by the heating elements. At the same time, the timer is triggered.

Throughout this action, the inner slider 15 remains resting internally on the outer slider 16, and is therefore holding the hook member 26 firmly in its rest angular position to maintain its engagement with the hook 29.

At the end of the toasting period, the electrical switch or switching arrangement controlled by the timer operates to cut off the power supply to the solenoid 28. The hook 29 is thus released from the solenoid's magnetic attraction, and consequently pivots backwards to give way to the hook member 26. As a result, the outer slider 16 is released to return to its top position under the action of the spring 22, carrying therewith the inner slider 15, the bread carrier and the toasted bread slices.

During bread toasting, it is sometimes necessary to stop the toaster to avoid over-heating caused by an excessively long timer setting, or in the interim to check the condition of the bread. With the use of a conventional toaster, this can be done by lifting the handle bar up to forcefully separate the internal movable assembly from the holding solenoid against magnetic attraction. This action often causes undesirable jerking of the toaster because the handle bar lifting force must overcome the solenoid's magnetic attraction, and it is usually necessary for the user to hold the toaster body stable beforehand.

With the use of the toaster of the subject invention, the premature or interim stopping of the toaster is done also by lifting the handle bar 31 upwards. But in this case, the upward movement of the handle bar 31 does not act against the magnetic attraction of the solenoid 28, because the inner slider 15 connected to the handle bar 31 is not being physically held in position by the solenoid 28. Instead, the inner slider 15 is merely resting on the outer slider 16 under its own weight and the weight of the handle bar 31, the bread carrier and the bread slices. When the inner slider 15 is lifted up, its arm 20 disengages vertically from the hook member 26 of the outer slider 16. Upon release, the hook member 26 instantly pivots downwards to disengage from the hook 29 and thus allow the outer slider 16 to carry the inner slider 15, the bread carrier and the bread slices to move upwards under the action of the spring 22.

It is appreciated that the manual uplifting force acted upon the handle bar 31 needs only to overcome the combined weight of the inner slider 15, the handle bar 31, the bread carrier and the bread slices, which is considerably smaller than the magnetic attraction force of the solenoid 28.

Accordingly, with the provision of a soft-touch release mechanism provided by the subject invention, it is not necessary for the user to hold the toaster body stable when the toaster is stopped in the middle of bread toasting.

The invention has been given by way of example only, and various other modifications of and/or air&rations to the described embodiment may be made by persons skilled in the art without departing from the scope of the invention as specified in the appended claims.

I claim:

1. A toaster comprising a casing, a carrier for supporting a slice of bread, said carrier being movable between an upper position to expose a said slice of bread outside the casing and a lower position to render a said slice of bread inside the casing, a heating element provided inside the casing for heating a said slice of bread when the carrier is in the lower position, an internal operating mechanism for moving the carrier, said operating mechanism comprising spring means for resiliently biasing the carrier upwards and holding means comprising a stationary solenoid for holding the carrier in the lower position, and a timer for controlling the time period during which a said slice of bread is to be heated by the heating element, characterised in that the holding means is releasable by a user at a point other than the solenoid in order to release the carrier from the lower position at any time during the said time period.

2. A toaster comprising a casing, a carrier for supporting a slice of bread, said carrier being movable between an upper position to expose a said slice of bread outside the casing and a lower position to render a said slice of bread inside the casing, a heating element provided inside the casing for heating a said slice of bread when the carrier is in the lower position, an internal operating mechanism for moving the carrier, said operating mechanism comprising spring means for resiliently biassing the carrier upwards and holding means comprising a stationary solenoid for holding the carrier in the lower position, and a timer for controlling the time period during which a said slice of bread is to be heated by the heating element, characterised in that the holding means is releasable by a user with a force relatively smaller than the holding force of the solenoid in order to release the carrier from the lower position at any time during the said time period.

3. The toaster as claimed in claim 1 characterized in that the holding means further includes two inter-engageable latching parts associated with the carrier and the solenoid, respectively, one of said latching parts being releasable by a user at any time during the said time period in order to release the carrier from the lower position.

4. The toaster as claimed in claim 3, characterised in that said one latching part is associated with the carrier.

5. The toaster as claimed in claim 4, characterised in that the operating mechanism further includes a first movable part connected with the carrier, to which movable part said one latching part is hinged.

6. The toaster as claimed in claim 5, characterised in that the operating mechanism further includes a second movable part which is movable relative to the first movable part in one direction to engage with and thus to maintain said one latching part in engagement with the other latching part position and in the opposite direction to disengage from and thus to allow said one latching part to disengage from the other latching part.

7. The toaster as claimed in claim 6, characterised in that the second movable part is movable in the first direction under the action of gravity.

8. The toaster as claimed in claim 4, characterised in that the other latching part is hinged and is arranged to be maintained in engagement with said one latching part by the solenoid.

9. The toaster as claimed in claim 1, characterised in that the operating mechanism further includes a handle associated with the carrier and adapted to be moved by a user downwards in order to move the carrier to the lower position and upwards in order to release the carrier from the lower position at any time during the said time period.

10. A toaster comprising a casing, a carrier for supporting a slice of bread, said carrier being movable between an upper position to expose a said slice of bread outside the casing and a lower position to render a said slice of bread inside the casing, a heating element provided inside the casing for heating a said slice of bread when the carrier is in the lower position, an internal operating mechanism for moving the carrier, said operating mechanism comprising spring means for resiliently biassing the carrier upwards and holding means comprising a stationary solenoid for holding the carrier in the lower position, and a timer for controlling the time period during which a said slice of bread is to be heated by the heating element, characterised in that the operating mechanism further includes a handle associated with the carrier and adapted to be moved by a user downwards in order to move the carrier to the lower position and upwards in order to release the carrier from the lower position at any time during the said time period, said downward movement of the handle requiring a force which is relatively smaller than the holding force of the solenoid.

11. The toaster as claimed in claim 2, characterized in that the holding means further includes two inter-engageable latching parts associated with the carrier and the solenoid, respectively, one of said latching parts being releasable by a user at any time during the said time period in order to release the carrier from the lower position.

12. The toaster as claimed in claim 11, characterized in that said one latching part is associated with the carrier.

13. The toaster as claimed in claim 12, characterized in that the operating mechanism further includes a first movable part connected with the carrier, to which movable part said one latching part is hinged.

14. The toaster as claimed in claim 13, characterized in that the operating mechanism further includes a second movable part which is movable relative to the first movable part which is movable relative to the first movable part in one direction to engage with and thus to maintain said one latching part in engagement with the other latching part position and in the opposite direction to disengage from and thus to allow said one latching part to disengage from the other latching part.

15. The toaster as claimed in claim 14, characterized in that the second movable part is movable part is movable in the first direction under the action of gravity.

16. The toaster as claimed in claim 12, characterized in that the other latching part is hinged and is arranged to be maintained in engagement with said one latching part by the solenoid.

* * * * *